United States Patent [19]

Brown et al.

[11] Patent Number: 5,119,268

[45] Date of Patent: Jun. 2, 1992

[54] ELECTRIC DISTRIBUTION DEVICE

[76] Inventors: George L. Brown, 3909 Urbandale Ave., Des Moines, Iowa 50310; George M. Brown, 1230 40th Plz.; Charles L. Brown, 2031 Maple Cir., both of West Des Moines, Iowa 50265

[21] Appl. No.: 611,937

[22] Filed: Nov. 9, 1990

[51] Int. Cl.⁵ .............................................. H02B 5/00
[52] U.S. Cl. ...................... 361/332; 174/48; 174/99 B; 361/361; 361/384; 361/426; 361/428; 361/429
[58] Field of Search ............... 174/97, 48, 99 R, 99 B, 174/101; 361/332, 355, 361, 378, 379, 384, 426, 428, 429

[56] References Cited

U.S. PATENT DOCUMENTS

| | | | |
|---|---|---|---|
| 2,341,841 | 2/1944 | Carlson | 174/99 B |
| 2,938,942 | 5/1960 | Stanback et al. | 174/99 B |
| 4,093,818 | 6/1978 | Thwaiter et al. | 174/48 |
| 4,940,414 | 7/1990 | Lee | 439/298 |
| 4,954,928 | 9/1990 | Jullien | 361/391 |

OTHER PUBLICATIONS

"CABL-BUS", product literature of MP HUSKY of Greenville, S.C.
"225-600 Ampere I-LINE Plug-in Busway", product literature of the Square D Company, 1986.
"GE Busway", product literature of GE, Apr. 1990.

Primary Examiner—Gregory D. Thompson

[57] ABSTRACT

An electric power distribution device for insulated conductors has a substantially rigid base, a housing, and at least one series of spaced apart support blocks for supporting such conductors at intermittent positions along their length. The support blocks are substantially enclosed within the combination of the housing and the base, extending substantially from the base to a position in close proximity to the housing top. The support blocks are formed of a substantially inflexible material.

16 Claims, 2 Drawing Sheets

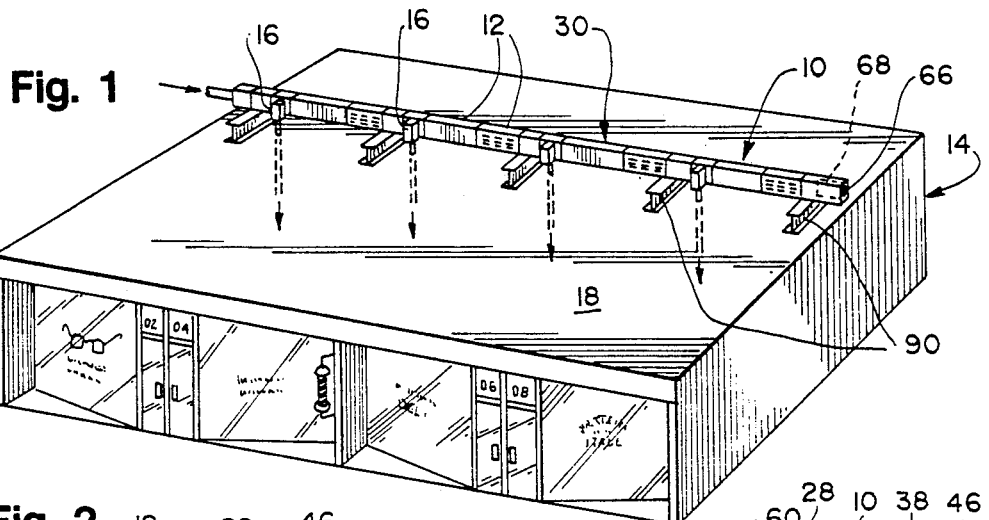
Fig. 1
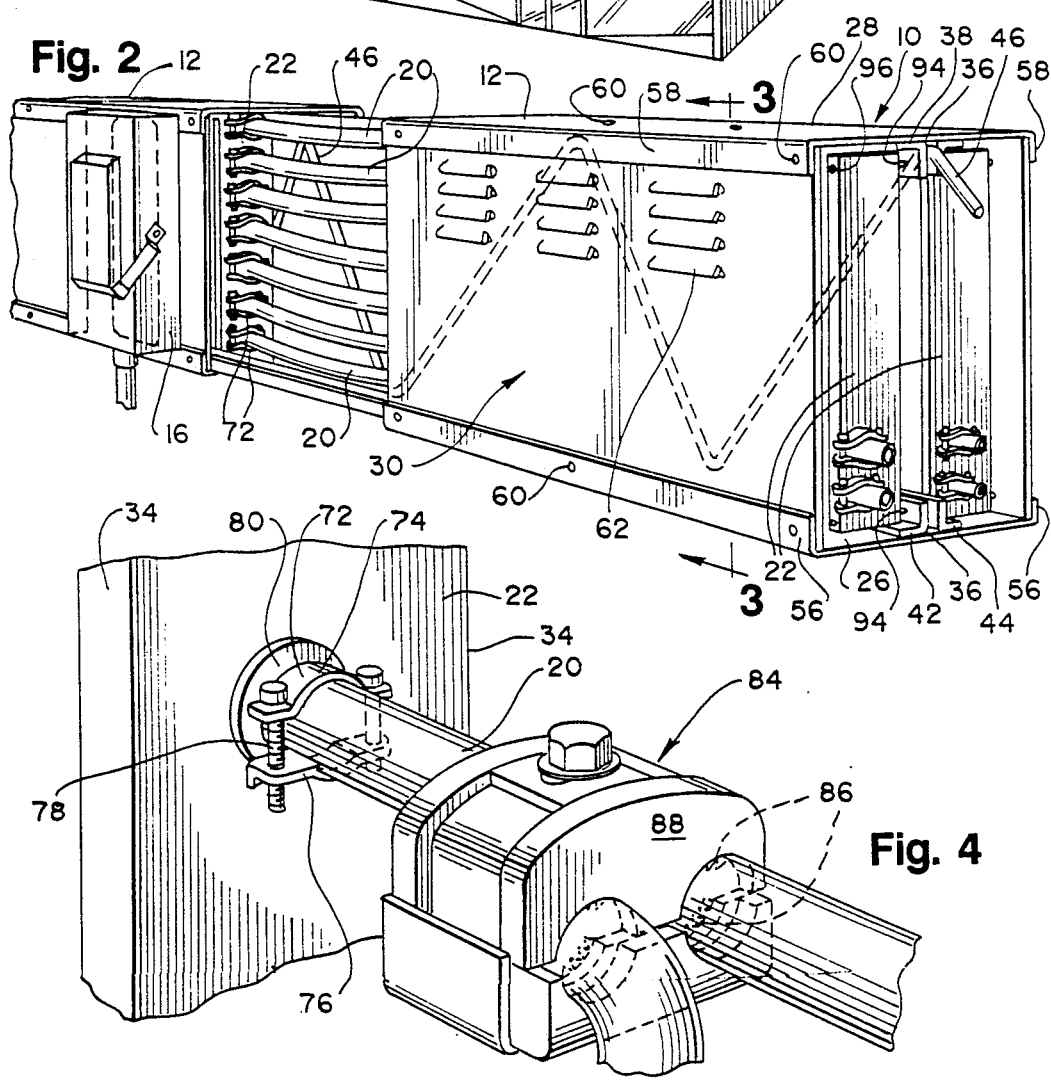
Fig. 2
Fig. 4

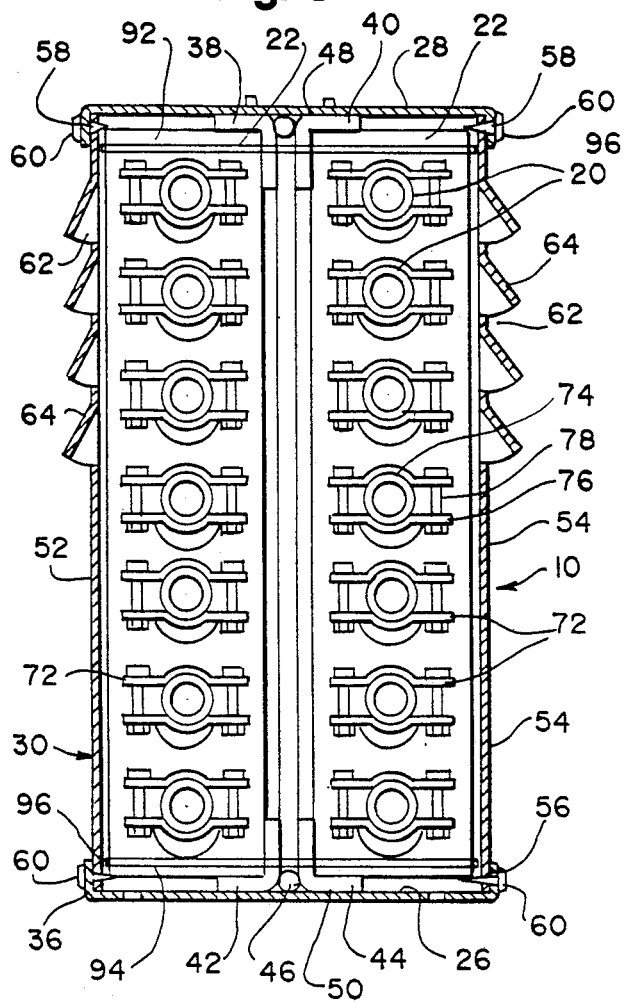
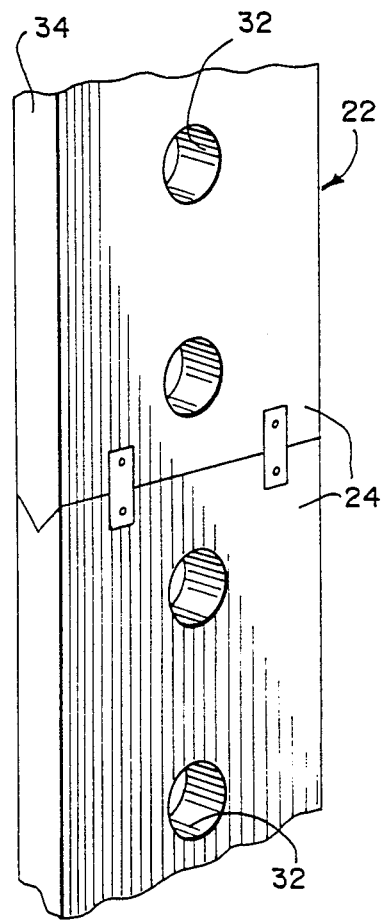
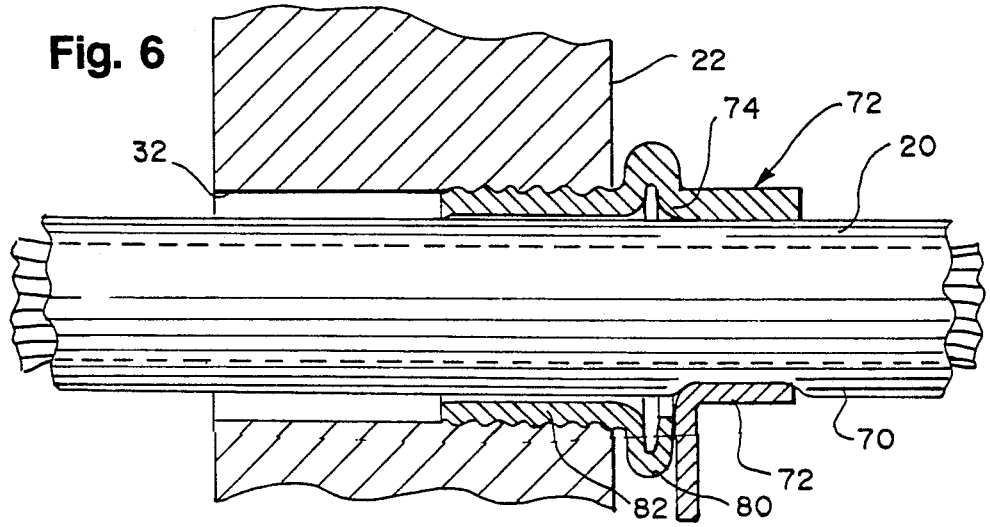

ELECTRIC DISTRIBUTION DEVICE

TECHNICAL FIELD OF THE INVENTION

The present invention is in the technical field of electric power transmission and distribution.

BACKGROUND OF THE INVENTION

In a typical municipality electric power is made available to electric power consumers via main power lines, the principal or major circuits of the electric power system. Such main power lines are generally routed so as to be reasonably close to the various residential and business facilities that are to be supplied with electric power. Between the main power lines and the facilities to be supplied with electric power are intermediate circuits that cut in on, or tap, the main power lines. If a main line is supported overhead by a pole, an intermediate circuit therefrom is supported at one end either by the pole or the main power line, and at the other end by attachment directly to the structure of the facility, usually high up on a wall. If the main line is underground, the intermediate circuit is generally run to the facility either in a conduit or as directly buried cable.

An intermediate circuit is eventually run through a main disconnect switch, an electric meter, and an electric distribution panel that divides the intermediate circuit into a plurality of tertiary circuits.

An intermediate circuit generally is encased in some form of protective conduit, such as a pipe or tube that houses the elongated electric conductor, and each conductor for a given facility is generally encased in its own conduit. Such conduits through which the wires (conductors) are run are relatively expensive to install. Electric circuits encased in such conduits may also be difficult and expensive to repair because such conduits do not permit easy access to the wires within, particularly when a conduit is rather long and there is no means of determining where along its length is the site of the problem.

Another type of intermediate circuit presently in use employs metal conductors in solid bar or rod form, instead of wire cables, enclosed in a housing. Such solid bars or rods of metal are generally substantially rigid and uninsulated.

It would be advantageous to provide, as a substitute for such types of intermediate circuits, an electric power distribution device that more conveniently supplies and distributes electric power to multi-unit facilities, for instance convention centers, industrial plants, office buildings, apartment buildings, shopping malls, strip malls and the like, whereby the one may tap into an intermediate circuit for a given unit at a location in close proximity to the unit for which the tap is made. It would be advantageous to provide an electric power distribution device that is less expensive to install, make taps from, and repair than the above described conventional intermediate circuits. It would be advantageous to provide an electric power and distribution device that carries a plurality of electric conductors. It would be advantageous to provide an electric power distribution device to which one or more fused disconnect switches may be integrated at the desired locations anywhere along the length of the electric power distribution device. It would be advantageous to provide an electric power distribution device that includes means for tapping the conductors thereof without removal of the insulation encircling such conductors. It would be advantageous to provide an electric power distribution device that includes a housing unit providing easy access to the conductors held within. It would be advantageous to provide an electric power distribution device that may be used in substitution for a conventional device regardless of whether such conventional device has a single conductor or a plurality of conductors.

These and other advantages of the present invention are described and illustrated in the description of the present invention below.

DISCLOSURE OF THE INVENTION

The present invention provides an electric power distribution device comprising at least one series of spaced apart support blocks for supporting at least one electric power insulated conductor at intermittent positions along the length thereof. In preferred embodiment such series of spaced apart support blocks are enclosed in a housing unit having at least one detachable side. In other preferred embodiment such electric power distribution device includes at least one electric power conductor supported by the series of support blocks and at least one means tapping such wire cable without the removal of insulation therefrom. These and other preferred embodiments of the present invention are described in more detail below.

BRIEF DESCRIPTION OF THE DRAWINGS

FIG. 1 is a perspective view of a series of modules comprising an electric power distribution device of the present invention, mounted on the roof of a multi-unit commercial facility;

FIG. 2 is a perspective view of an electric power distribution device of the present invention with certain components removed;

FIG. 3 is sectional side view of the electric power distribution device of FIG. 2, taken along line 3 of FIG. 2;

FIG. 4 is a perspective view of a conductor and grasping means and tap to the conductor of the electric distribution device as shown in FIG. 2;

FIG. 5 is a sectional side view of support block, conductor and grasping means of the electric power distribution device of FIG. 2; and FIG. 6 is section perspective view of support block segments of the electric power distribution device of the present invention.

PREFERRED EMBODIMENTS OF THE INVENTION

Referring now to the drawings, there is shown generally in FIG. 1 an electric power distribution device of the present invention, designated generally by the reference numeral 10. The electric power distribution device 10 as shown in FIG. 1 includes a plurality of electric power distribution modules 12 which are interconnected end to end forming an elongated series of modules 12 that extends from one side to the other side of a multi-unit facility 14, which multi-unit facility 14 is depicted in FIG. 1 as a series of commercial facilities or stores placed side-by-side within a single building. The elongated series of modules 12 are shown disposed on the roof of the multi-unit facility 14, and hence a portion of the series of modules 12 is disposed directly above each unit of the multi-unit facility 14. Integrated with the series of modules 12, as shown in FIG. 1, are a plurality of disconnect switch units 16, and as shown there is one disconnect switch unit 16 for each unit of the multi-unit facility 14. Such disconnect switch units 16 are located so that each is directly above a unit of the multi-unit facility 14, and electric power is supplied to each of such units of the multi-unit facility 14 through the disconnect switch unit 16 above it, as described in more detail below.

As shown in FIG. 1, the series of electric power distribution modules 12 of the electric power distribution device 10 of the present invention is disposed on a horizontal surface, that is the top or roof 18 of the multi-unit facility 14, and the modules 12, being disposed parallel to such roof 18, are also disposed in a horizontal position. Such horizontal disposition of the modules 12 of the electric power distribution device 10 of the present invention is only one of many possible dispositions. The present electric power distribution device 10 may be mounted on the side of a facility, in a substantially vertical disposition, or any other disposition between a horizontal disposition and a vertical disposition. For instance, when a facility to be supplied with electric power is comprised of a series of side-by-side units, such as the multi-unit facility 14 shown in FIG. 1, the most convenient location for the electric power distribution device 10 may well be the roof 18 as shown, and since that roof 18 is substantially horizontal, so is the device 10. Such position permits the disconnect switch units 16 to be in close proximity to the individual units of the multi-unit facility 14. If the facility was instead a multi-story building, for instance a multi-story commercial or office or residential building, the most convenient installation of the electric power distribution device 10 of the present invention may be vertically, up the side of such building, so as to dispose the circuit taps for each unit or plurality of units at a given height at their height, in close proximity thereto. Obviously when necessary or most convenient the electric power distribution device 10 of the present invention may also be disposed along any incline from the horizontal or vertical.

It is believed that the electric power distribution device 10 of the present invention so minimizes the overall length of the electric conductors required to supply electric power to a given facility that the energy dissipated through the resistance of such conductors is significantly reduced, and hence the cost of the electric power is reduced.

Although the present invention is not in anyway limited to a horizontal disposition of the electric power distribution device 10, as discussed above, the following description of the details of the electric power distribution device 10, for simplicity, will presume a horizontal disposition of the device 10.

Referring now also to FIG. 2 through FIG. 6, the electric power distribution device 10 as shown holds a plurality of insulated conductors 20 which conductors 20 are supported by a series of spaced apart support blocks 22. Each support block 22 is a piece of substantially inflexible material, preferably a material that is substantially nonconductive to electricity, such as nylon, fiberglass or an insulating type of plastic, although natural materials such as wood may possibly be used. Each support block 22 may be a single piece, or it may be formed of interlocked support block segments 24, particularly as shown in FIG. 5. Regardless of whether the support blocks 22 are single pieces or formed of support block segments 24, the support blocks 22 extend from a position in close proximity to the base 26 of a module 12 of the electric power distributing device 10, to a position in close proximity to the top 28 of the module's housing, which housing is designated generally by the reference numeral 30. In other words, the support blocks 22 extend substantially from the top to the bottom of the module 12 in which they are disposed, preferably at least about 70 or 75 percent of the distance, and more preferably at least 85 percent of the distance. The width of any support block 22 is wider than the width of the conductor to be carried. The width of a support block 22 and the minimum depth thereof is at least in part dependent upon the material of which it is formed. As noted above, a support block 22 is to be substantially inflexible. Considering for instance a support block 22 formed of wood, between hard woods and soft woods, to obtain the desired rigidity along the length of the support block 22, the minimum depth of a soft wood support block 22, and probably the minimum width (provided of course in all instances the width is greater than the width of the conductor 20) would be greater than the minimum depth and width of a hard wood support block 22, because of course the hard woods require less bulk for a given rigidity.

As indicated above, a series or plurality of spaced apart support blocks 22 are required. Such series or plurality of support blocks 22 are disposed relative each other in substantially parallel planes, or in other words one behind each other. Each support block 22 has at least one aperture 32 located somewhere along its length, and within a series of support blocks 22 such apertures 32 are preferably aligned with one another, both as to their height, as measured from the base 26 of the module 12, and as to their placement between the side edges of the support blocks 22, when as shown the support blocks 22 of a series are of substantially of the same configurations. A conductor 20 supported in a module 12 is threaded through the aligned apertures 32 of the support blocks 22 in a series, which support blocks 22 support such conductor 20 at intermittent positions along its length.

In preferred embodiment, as shown in the drawings, each support block 22 has a plurality of apertures 32, disposed substantially one above the other, generally in the center of the support block 22, equidistant from the side edges 34 of the support block 22, and a plurality of such support blocks 22 are thus capable of supporting a plurality of conductors 20 in positions spaced apart from each other.

In preferred embodiment, the electric power distribution device 10 has an internal frame 36 which is mounted on the base 26 of a module 12 of the electric power distribution device 10. The internal frame 36, as shown in the drawings and in preferred embodiment, is positioned centered on the base 26, and there is a series of support blocks 22 on both sides of the internal frame 36. The internal frame 36 should be formed of substantially rigid material and the internal frame 36 thus should at least contribute to the structural integrity of the module 12 of the electric power distribution device 10. The internal frame 36 may be formed of substantially rigid nonconducting material, but it may also be formed of metal, such as steel, aluminum and the like, and steel may be the material of choice because it provides generally the strength and rigidity desired at a reasonable cost. The internal frame 36 as shown is a section of open web steel joist, which is a commercially available material. Such open web steel joist type internal frame 36 is comprised of a first and second upper members 38, 40, a first and second lower members 42, 44 and a plurality of interconnecting rods 46. The upper and lower members 38, 40, 42, 44 are each elongated right angle members, disposed at the upper and lower ends of the internal frame 36 respectively adjacent one another but slightly spaced apart, to form substantially flat upper and lower surfaces. In more detail, the first and second upper members 38, 40 are positioned so that one of the two sides of each (which meet at a right angle) lie in the same upper horizontal plane while the other of the two sides of each are disposed substantially coextensive although somewhat spaced apart. The first and second lower members 42, 44 are disposed in mirror-image relationship to the upper members 38, 40 and form a lower surface. The interconnecting rods 46 interconnect the upper members 38, 40 to each other, the lower members 42, 44 to each other, and the upper and lower member 38, 40, 42, 44, spanning the space between the upper members 38, 40 and the lower member 42, 44 along diagonal lines. The interconnecting rods 46 are secured to each of the upper and lower members 38, 40, 42, 44 generally by welding. The internal frame 36 need not be formed of open web steel joist, but it is preferred that such internal frame 36 have both an upper and lower surface, which surfaces are disposed in substantially parallel planes, that such surfaces be held apart, and that the frame 36 be relatively strong without any excess bulk or excess weight. The upper surface of the internal frame 36 can be considered a flat head 48 thereof, and the lower surface of the internal frame 36 can be considered a flat foot 50 thereof, and preferably, as when an open web steel joist is used, the internal frame 36 is balanced, both the head 48 and foot 50 extending equidistances from the center line of the frame 36.

The internal frame 36 as shown and in preferred embodiment extends substantially the length of the module 12 and is substantially centered therein.

Each support block 22 preferably is disposed below and partially under one side of the flat head 48 of the internal frame 36 and above and partially over one side of the flat foot 50 of the internal frame 36. When there is a series of support blocks 22 on either side of the internal frame 36, which is a preferred arrangement, the support blocks 22 are preferably arranged in pairs, that is one support block 22 of the series disposed on the right hand side of the internal frame 36 will have a mate on the right hand side of the internal frame 36, and these pairs will preferably be interconnected to each other, preferably close to both the top and bottom of the support blocks 22 in the pair.

Pairs of support blocks 22, that is one on either side of the internal frame 36, are preferably interconnected to the upper and lower members 38, 40, 42, 44 of the internal frame 36, and to each other, and thus supported in the vertical position by means of for instance upper and lower bolts 92, 94, each secured at its free ends with bolt head nuts 96. Such bolts 92, 94 may extend, as shown, from the far side of one support block 22, through that block 22 about its upper or lower end, though the internal frame upper and lower members 38, 40, 42, 44, and then through the other support block 22 of the pair. Preferably both upper and lower bolts 92, 94 are employed, but in instances where the electric power distribution device 10 has only one series of support blocks 22 disposed to only one side of the internal frame 36, such bolts 92, 94 may extend only from the far side of a support block 22 through the adjacent upper and lower members of the internal frame 36.

As noted above, the conductors 20 are threaded through the aligned apertures 32 of the support blocks 22 in a series, and generally there is a series of support blocks 22 on each side of the internal frame 36. While it is possible that the apertures 32 themselves provide the support to the conductors 20, it is generally preferable that the conductors 20 are held reasonably firmly and stationarily at the intermittent locations of the support blocks 22, and if the internal surface of the apertures 32 alone are to provide the holding contact, the best support would be provided by apertures 32 that only slightly larger in width than the conductors 20 being held, and such embodiment would create difficulties in the threading of the conductors 20 through such apertures 32 Hence in preferred embodiments the support blocks 22 are provided with means for grasping the conductors 20 disposed in close proximity to a given aperture 32.

The conductor grasping means 72 at minimum provides at least upper and lower stationary point contact with the insulated conductors 20, restraining movement of such conductors 20 in the direction of the point contact. In preferred embodiment, such grasping means 72 contact the insulated conductor 20 along at least about 20 percent, and more preferably at least about 30 percent, of the conductor's total cross section circumference, such contact being divided between the upper and lower regions of such circumference, to restrain movement not only upwardly and downwardly, but sideways also due to the substantially circular cross section shape of the insulated conductor 20. Such grasping means 72 preferably is comprised of an upper and lower arm 74, 76, at least one of which is adjustable, as shown in FIG. 4, wherein the adjustable upper arm 74 is connected to the stationary lower arm 76, on either side of the insulated conductor 20, by self-locking screws 78, the lower arm 76 being mounted or welded on a plate 80 having a rearwardly extending tube 82 fitted within the aperture 32 of the support block 22. The arms 74, 76 are each curved so as to make contact with the insulated conductor 20 along about one-third of its circumference as shown. Such type of grasping means 72 may be mounted on either or both sides of a support block aperture 32 or even within such aperture 32, provided that the grasping means 72, at least when fitted about a conductor 20, is stationarily mounted on the support block 22.

As can be seen from the drawings and the foregoing descriptions, the electric conductors 20 are securely spaced apart from one another, and from the internal frame 36 within a module 12 of relatively compact size, and when such conductors 20 on each side of the internal frame 36 are disposed substantially one above the other, each conductor 20 is accessible from its respective side of the module 12, no conductor 20 being disposed behind the other. In such preferred embodiment on each side of the internal frame 36 the conductors 20 form an arrangement wherein they extend in substantially parallel lines and lie substantially in the same vertical plane. In further preferred embodiment the housing 30 contributes to the ease of access to the conductors 20, as described below.

In preferred embodiment the housing top, or top section 28, extends beyond the outer edges of the support blocks 22 on either side of the internal frame 36, and is secured to the flat head 48 of the internal frame 36. In preferred embodiment such top housing section 28 is a separate piece for each module 12, and is only detachably secured to the sides 52, 54 of the housing 30, and further the top housing section 28 is not removed when access to the conductors 20 is desired. Thus a reasonably permanent and strong means for securing the top housing section 28 to the internal frame 36, or flat head of the internal frame 36, may be used, for instance one or preferably a plurality of bolts, or if desired even by welding. Securely attaching the top housing section 28 to the top of the internal frame 36 will contribute to the structural integrity of the module 12. A similar or even more permanent means for securing the flat foot 50 or bottom of the internal frame 36 to the base 26 of the module 12 may be employed.

The first and second housing sides 52, 54 are preferably reasonably easy to detach. As shown best in FIG. 3, the module base 26 is formed with upward extending flanges 56, and the top housing section 28 is formed with downward extending flanges 58, each flange 56, 58 being securable to one of the housing sides 52, 54 by conventional means such as bolts or screws 60. In preferred embodiment the first and second housing sides 52, 54 fit within the downward extending top housing section flanges 58, and outward of the upward extending base flanges 56 to provide the greatest protection from precipitation or other environmental hazards for the internal components of the electric power distribution device 10. When access to the conductors 20 on one side or the other is desired, the adjacent housing side, either the first or the second side 52, 54, is detached from the base 26 and the top housing section 28, and removed, exposing all of the conductors 20 mounted on such side. The housing 30 generally may be formed of 12 to 14 gauge paint bonded sheet metal or other material of commensurate strength and rigidity, and its strength and rigidity is enhanced by the attachment of the top housing section 28 to the top of the internal frame 36, and then the attachment of the first and second housing sides 52, 54 along their top and bottom edges respectively to the top housing section 28 and the module base 26.

In preferred embodiment, at least one of the first and second housing sides 52, 54 has at least one, and preferably a plurality of, vents 62, which vents 62 preferably are provided with hoods 64, shown in the drawings as a downwardly sloping hoods 64, to protect the openings of the vents 62 from the outer environment, particularly from precipitation. As shown in the drawings, the electric power distribution device 10 is disposed horizontally, and as discussed above, this disposition may instead be vertical or any incline in between. If desired, for a module 12 to be used in an inclined or vertical position, the hoods 64 of the vents 62 may be modified in length, shape or disposition to provide the desired protection from the outer environment, and such modification is within the skill of a person of ordinary skill in the art. Such vents 62, regardless of whether hooded or not, provide air-flow communication between the internal area of a module 12 and the outer atmosphere, a feature discussed further below.

As seen from the foregoing discussion, the housing 30 generally is of a U-shaped cross-section which together with the base 26 encloses and protects internal components.

Generally the top housing section 28 will extend, as a single piece, along the entire length of a given module 12. The first and second housing sides 52, 54 similarly may each be formed of a single piece that extends along the entire length of a given module 12, but in many instances, unless the module 12 itself is relatively short, the first and second housing sides 52, 54 are formed as a plurality of sections, each section being separately detachable from the remainder of a given module 12. The advantages of this preferred embodiment will be discussed in greater detail below.

To facilitate tapping into one of the conductors 20 held within a module 12, a conventional disconnect switch unit 16, for instance a fused disconnect switch, may be integrated into a module 12 by mounting such switch unit 16 onto a section of the first or second housing sides 52, 54, and providing access for electric lines through that housing side section behind the mounted disconnect switch unit 16 by aperture(s) through that housing side section. That housing side section on which a disconnect switch unit 16 is mounted preferably should extend only the width of the disconnect switch unit 16 or slightly more than the width of the disconnect switch unit 16, so that the adjacent housing side may be detached to provide easy access to the internal components of the module 12 in the area adjacent the mounted disconnect switch unit 16 while the mounted disconnect switch unit 16 and the housing side section on which it is mounted remain in place, secured to the base 26 and the top housing section 28.

The tapping into a conductor 20 may be accomplished using any approved electric splicing means, but in preferred embodiment the tapping is done with an insulation piercing connector 84 as shown in FIG. 5, which insulation piercing connectors are commercially available, for instance from ILSCO of Cincinnati, Ohio. Such insulation piercing connector 84, referred to hereinafter as an IP connector 84, has at least two pairs of jaws 86 encased in a housing 88 which pairs of jaws 86 each separately pierce through the insulation 70 of an insulated conductor 20, and by virtue of an internal interconnection between the two pairs of jaws 86 the insulated conductors 20 within the IP connector 84 are electrically interconnected, and thus the tap between the conductors 20 is made, without the removal of any section of the insulation 70. This means for tapping the insulated conductors 20 within the electric power transmission device 10 of the present invention permits the taps to be made easily, efficiently and with greater safety than splicing means that require a portion of the insulation 70 to be removed and then the exposed areas to be wrapped to reinsulate them. Such IP connector 84 cannot be used unless wire cable type conductors 20 are used, and mounted in a manner to provide access thereto; such IP connectors 84 cannot be used when the conductors are held in solid conduits or are of the bar or rod type. The ability to employ IP connectors 84 for tapping is a highly advantageous feature of the present invention.

The tapped line is generally run through the disconnect switch unit 16, and hence the tapping is generally done at a point along the length of the conductor 20 that is in close proximity to the disconnect switch 16, and preferably directly behind the disconnect switch 16, access to that region being provided through the adjacent section of housing side 52 or 54.

The module(s) 12 of the electric power distribution device 10 of the present invention preferably are manufactured as a one-piece unit, with of course detachable housing sides 52, 54, and the electric conductors 20 may be incorporated into a module 12 during the manufacture of the module 12, or instead at the site of use, during installation. Such one-piece manufacture permits an electric power distribution device 10 of the present invention to be installed at the site of use easily, efficiently and at lower costs compared to conventional intermediate circuit devices. An electric power distribution device 10 may be formed of a single or a plurality of modules 12, typically connected end-to-end with bolts or the like, and hence the modules 12 may be manufactured in lengths that are convenient for manufacturing, handling and installation, while at the same time the overall length of the electric power distribution device 10 is not in anyway limited by such practical considerations. To protect the internal components of an electric power distribution device 10, the far end thereof, regardless of whether the distribution device 10 is formed of a single module 12 or a plurality of modules 12, interconnected end to end, is enclosed with an end cap 66, which end cap 66 may be formed of the same material as the housing 30 generally, or another convenient, and preferably water-proof, material. The end cap 66 may be formed to fit snuggly within the end of the last module 12 of the distribution device 10, and is secured to the housing 30 thereof by conventional means such as screws or bolts.

When a plurality of modules 12 are incorporated into a single electric power distribution device 10, or when a plurality of side housing sections 52, 54 are used for a single module 12, it is preferable to have the housing 30 of one module 12 overlapping that of the adjacent module 12 somewhat, or one side housing section 52, 54 overlapping the adjacent side housing section 52, 54, and have the overlapping sections secured together by bolts or metal screws or the like.

In preferred embodiment the height and width dimensions of a given module 12 are within the range of from 10 inches wide and 16 inches high, to from 20 inches wide and 30 inches high. Such dimension of course be smaller, but the advantage of holding a significant number of conductors 20 would then be diminished. Such dimensions may of course be larger, but then the size and shape advantages of practical considerations as to manufacturing, handling and installation are believed somewhat diminished. In preferred embodiment, a given module 12, and hence a given electric power distribution device 10, is from about 20 to about 80 percent higher than it is wide, and in more preferred embodiment from about 40 to about 60 percent higher than it is wide.

A typical electric power distribution device 10 holds at least about 6 conductors, preferably 3 conductors 20 per side, and preferably holds at least 12 conductors 20, with 6 conductors 20 on each side. If the distribution device 10 is within the preferred dimensions noted above, it is believed that it can hold up to about 30 conductors 20, with 15 conductors 20 on each side.

It is advantageous to employ the electric power distribution device 10 so that excess internal space is minimized and the capacity, as to the number of conductors 20 held within, is maximized, while minimizing any hazard risks. The insulated conductors 20, described in more detail below, have a significant degree of flexibility, but as noted provide great advantages as to the means of tapping. Given such flexibility, and further given the advantages derived from maximizing the capacity of the electric power distribution device 10 as to the number of conductors 20 held within, the structural integrity of the modules 12 as a whole is of great importance, and further the structural integrity of the means employed for holding such conductors 20 spaced apart from one another is of very great importance. Hence the use of the support blocks 22 described herein, in comparison to the use of individual conductor holding means, separately mounted, is an important and highly advantageous feature of the present invention. Unlike individual conductor holding means, which could be individually damaged or loosened from the mounting apparatus, permitting one or more conductors 20 to become misaligned, the support blocks 22 would have to be demolished as a whole before such misalignment would occur, and the risk hazards are thus greatly diminished with the electric power distribution device 10 of the present invention.

In preferred embodiment, the support blocks 22 in a series, that is disposed one behind the other on a given side of the internal frame 36, are spaced apart from one another at the greatest distance reasonable without jeopardizing the ability of the series of support blocks 22 to hold the conductors 20 in substantially straight line positions. If the support blocks 22 of a series are more closely spaced than necessary, a greater portion of the conductors 20 than necessary would be encased by the surrounding portion of the support blocks 22, and the support blocks 22 used, being greater in number per unit length than necessary, would occupy an unnecessary amount of space within a module 12, and would unnecessarily increase the weight and cost of the electric power distribution device 10. In preferred embodiment, the support blocks 22 in a given series, that is disposed one behind the other on a given side of the internal frame 36, are space apart a distance of from about 36 inches to about 5 feet, depending on the size of the conductor(s) 20 being held thereby.

The electrical conductors 20 held within the electric power distribution device 10 are, as mentioned above, insulated type of conductors. The conductors 20 are generally a plurality of wires of suitable material for conducting electricity, for instance copper or aluminum wires, held in elongated bundles, for instance by intertwining the individual wires, or for heavier individual wires held in contact with surrounding wires by a restraining means which typically is the encasing insulation. The wire cable type of conductors generally are encased in an insulation, which insulation, while preventing generally contact between the conducting wires and the outer atmosphere, nonetheless permits heat transfer from the wires to the outer atmosphere to a reasonable extent. Such insulated type of conductors are well known to those persons of ordinary skill in the art. In preferred embodiment it is generally desirable to avoid any significant build-up of heat in the area around the conductors 20. The support blocks 22, by holding or encasing the insulated conductors 20 only at intermittent locations along the lengths of such conductors 20, minimize the combined total lengths of such conductors 20 that are encased or sheaved by the inner surfaces of the apertures 32 and grasping means, and thus minimize interference with dissipation of heat from the area immediately surrounding the conductors 20, as compared to an electric conductor that is substantially encased within a material that does not permit heat dissipation freely, for instance a convention conduit such as a pipe. As such heat dissipation increases, the operating temperature of the conductors 20 is reduced, overheating is reduced, and the amperage that can flow through the conductors is increased.

Further, the conductors 20 that may be employed in the electric power distribution device 10 may be low, medium or high current conductors, but in preferred embodiment are high current conductors, such as for instance from about 615 to about 700 amps conductors, as compared to single 340 to 350 amps conductors generally carried in a standard conduit.

As discussed above, the dissipation of heat in the area of the conductors 20 increases the efficiency of the conductors 20, and such conductors 20 may well be high current conductors. Also noted above is that in preferred embodiment the housing 30 is vented to the outer atmosphere, providing in and of itself a degree of air flow through the internal portion of the electric power distribution device 10. In further preferred embodiment the electric power distribution device 10 includes one or more forced-air blowers 68 so as to provide a greater degree of air flow within the internal sections of the electric power distribution device 10, which forced-air blowers 68 may be thermostatically controlled. Such a forced-air blower(s) may be mounted within the module(s) 12 of the electric power distribution device 10 as needed along its length or at the far end thereof. Alternatively the forced-air blower(s) 68 may be externally mounted, for instance in a manner such as shown for mounting a disconnect switch unit 16. Regardless of how installed, a forced-air blower(s) 68 provides an internal positive air pressure which facilitates heat dissipation and further facilitates maintenance of a dust free environment within the electric power distribution device.

The electric power distribution device 10 of the present invention receives and distributes electric power of both the high voltage and low voltage type.

As shown in FIG. 1, it may be convenient to support the electric power distribution device 10 at a position above the surface of the roof 18, or other surface on which it is mounted, with support beams 90 placed under the electric power distribution device 10 at intervals along its length, so as to protect it from standing water that may collect on the roof 18 and the like, and further to position the electric power distribution device 10 and its internal components at a convenient height for installation, the making of taps, repairs and the like.

Industrial Applicability of the Invention

The present invention is applicable to the electric power distribution and receiving industries, and any industries employing electric power of either high voltage or low voltage.

We claim:

1. An electric power distribution device comprising:
a substantially rigid base;
a housing, said housing being comprised of a top section and two opposed sides, said top section being normally interconnected to each of said two sides, and said two sides each being normally interconnected to said base;
two series of spaced apart support blocks each for supporting at least one electric power insulated conductor at intermittent positions along the length of the conductor; and
an internal frame disposed substantially centered between said two housing sides and extending substantially the length of said housing;
wherein said two series of support blocks are disposed on opposite sides of said internal frame and are enclosed within said base and said housing, and wherein said support blocks of each of said two series of support blocks are each formed of a substantially inflexible material and extend from a position in close proximity to said base to a position in close proximity to said top section of said housing.

2. The electric power distribution device of claim 1 wherein at least one of said blocks of said series of support blocks is formed of a plurality of interconnected block segments.

3. The electric power distribution device of claim 1 wherein said top section of said housing is substantially stationarily afixed to the top of said internal frame and said two opposed sides of said housing are detachable from said housing top and said base.

4. The electric power distribution device of claim 1 wherein said support blocks of at least one of said series of support blocks each have an aperture through which an insulated conductor may be passed.

5. The electric power distribution device of claim 1 wherein said support blocks of at least one of said series of support blocks each have a plurality of apertures disposed substantially one above the other for supporting a plurality of the insulated conductors each in a position substantially one above the other and adjacent one of said two sides of said housing.

6. The electric power distribution device of claim 5 further including a plurality of means for positively grasping an insulated conductor, each of said grasping means being mounted on one of said support blocks in close proximity to one of said apertures.

7. An electric power distribution device comprising:
an elongated substantially rigid base;
an elongated housing comprised of a top and opposed sides, said housing being connectable to said base along the bottom edge of said opposed housing sides;
an elongated internal frame disposed substantially centered within said housing, and having a substantially flat upper and lower surface, said upper surface being interconnected to said housing top and said lower surface being interconnected to said base; and
a plurality of pairs of support blocks, the support blocks of each pair being disposed on opposite sides of said elongated internal frame, said support blocks each having at least one aperture through which an electric insulated conductor may be passed.

8. The electric power distribution device of claim 7 further comprising a plurality of modules, each of said modules having a section of said elongated base, a section of said elongated housing, and a plurality of said pairs of support blocks, said modules being interconnected end to end.

9. The electric power distribution device of claim 8 further including a plurality of electric insulated conductors, at least one of which insulated conductors extends through a plurality of said modules.

10. The electric power distribution device of claim 8 wherein at least one of said modules is from about 20 to about 80 percent higher than it is wide and holds at least a section of each of at least 12 electric insulated conductors.

11. The electric power distribution device of claim 7 wherein said support blocks each have a plurality of apertures disposed substantially one above the other.

12. The electric power distribution device of claim 7 further including a plurality of vents in said housing sides and at least one forced air blower disposed within said housing.

13. The electric power distribution device of claim 7 further including a plurality of means for grasping an insulated conductor, said grasping means being mounted stationarily on at least one of said support blocks.

14. The electric power distribution device of claim 13 wherein said grasping means is comprised of an adjustable upper arm, a stationary lower arm and a pair of self adjusting screws interconnecting said upper arm and said lower arm.

15. The electric power distribution device of claim 7 wherein both of said housing top and said base have side flanges adjacent each of said housing sides, and said housing sides normally are connected to the inner sides of said housing top flanges and the outer sides of said base flanges.

16. The electric power distribution device of claim 7 further including a plurality of electric insulated conductors supported by said support blocks, a disconnect switch mounted on the outer side of one of said housing sides, and a tapping means, wherein at least one of said insulated conductors is tapped.

* * * * *